(12) United States Patent
Caratiola

(10) Patent No.: US 12,097,606 B2
(45) Date of Patent: Sep. 24, 2024

(54) BICYCLE TRANSPORT CONTAINER AS WELL AS ROLLING ELEMENT FOR A BICYCLE TRANSPORT CONTAINER

(71) Applicant: Canyon Bicycles GmbH, Koblenz (DE)

(72) Inventor: Nicolas Caratiola, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 744 days.

(21) Appl. No.: 17/087,776

(22) Filed: Nov. 3, 2020

(65) Prior Publication Data

US 2021/0129312 A1 May 6, 2021

(30) Foreign Application Priority Data

Nov. 4, 2019 (DE) ............. 20 2019 106 107.3

(51) Int. Cl.
*B25H 1/00* (2006.01)

(52) U.S. Cl.
CPC ................. *B25H 1/0014* (2013.01)

(58) Field of Classification Search
CPC .................................... B25H 1/0014
See application file for complete search history.

(56) References Cited

U.S. PATENT DOCUMENTS

| | | | |
|---|---|---|---|
| 4,772,035 A | 9/1988 | Danial | |
| 5,669,497 A | 9/1997 | Evans et al. | |
| 8,196,740 B2 | 6/2012 | Jacques et al. | |
| 9,821,948 B2 * | 11/2017 | Noer | A45C 5/14 |
| 10,329,083 B1 * | 6/2019 | Chuang | B62J 19/00 |
| 10,377,175 B2 * | 8/2019 | Franzone | |
| 2018/0134074 A1 | 5/2018 | Franzone, Jr. et al. | |

FOREIGN PATENT DOCUMENTS

| | | | | |
|---|---|---|---|---|
| CN | 201839956 U | 5/2011 | | |
| DE | 10019542 A1 | 11/2000 | | |
| EP | 2241455 A2 * | 10/2010 | ......... | B60B 33/0002 |
| GB | 339189 A | 12/1930 | | |
| JP | S49129252 U | 11/1974 | | |
| WO | 2014086907 A1 | 6/2014 | | |

* cited by examiner

*Primary Examiner* — James A Shriver, II
*Assistant Examiner* — Nicholas R. Kandas
(74) *Attorney, Agent, or Firm* — The Webb Law Firm

(57) ABSTRACT

Bicycle transport containers include a typically parallelepiped-shaped outer container. Retaining and/or receiving elements are provided inside the outer container for receiving bicycle elements such as bicycle frames, wheels and the like. In order to facilitate the transport of a bicycle transport container, the invention provides rolling elements on a bottom element of the outer container.

20 Claims, 4 Drawing Sheets

BICYCLE TRANSPORT CONTAINER AS WELL AS ROLLING ELEMENT FOR A BICYCLE TRANSPORT CONTAINER

CROSS-REFERENCE TO RELATED APPLICATION

This application claims priority to German Patent Application No. 20 2019 106 107.3 filed Nov. 4, 2019, the disclosure of which is hereby incorporated by reference in its entirety.

BACKGROUND OF THE INVENTION

Field of the Invention

The disclosure relates to a bicycle transport container as well as to a rolling element for a bicycle transport container.

Description of Related Art

Bicycle transport containers serve for the transport and in particular for the shipping of bicycles. For this purpose, the bicycle transport containers comprise a typically parallelepiped-shaped outer container in which the partly disassembled bicycle is arranged for transport. For avoiding damage to the bicycle or individual components of the bicycle during transport, retaining and/or receiving elements are provided inside the outer container for bicycle elements such as the bicycle frame, the wheels, the handlebar and/or other bicycle components. The transport of such a bicycle transport container for private persons, e.g. on travels, is difficult due to the weight and the dimensions.

It is an object of the invention to provide a bicycle transport container that is easier to transport.

The object is achieved according to the disclosure with a bicycle transport container and a rolling element for a bicycle transport container.

SUMMARY OF THE INVENTION

The bicycle transport container comprises an in particular parallelepiped-shaped outer container. Typically, the same has a bottom element and a cover element, besides four side elements. Inside the outer container, retaining and/or receiving elements for bicycle elements such as the bicycle frame, the wheels and the like are provided. According to the invention, a rolling element is arranged at a bottom element of the outer container. The rolling element comprises a roller or a wheel, with preferably at least two and in particular at least four such rolling elements being arranged at the bottom element of the bicycle transport container. Even when only a single rolling element with a correspondingly wide roller is provided, it is already possible to lift the bicycle transport container on one side and to transport it much easier using the corresponding rolling element. It is preferred to provide at least two rolling elements arranged on one side of the bottom element, so that, again, by lifting the container on the opposite side, a simple transport of the bicycle transport container is possible. It is particularly preferred to provide four rolling elements, with one rolling element being arranged in the region of a corner of the bottom element, respectively, so that the bicycle transport container can be pushed or pulled in a simple manner. Here, the rollers are preferably designed such that they are pivotable about an axis which, in the mounted state, extends in particular vertically.

Preferably, the bottom element comprises an opening for receiving one respective rolling elements, wherein, when a plurality of rolling elements is provided, one opening is preferably provided for each rolling element, respectively. For a bicycle transport container of cardboard, it is preferred that the corresponding openings are defined by a perforation and/or a marking, so that it is possible for a user to create the corresponding openings by cutting with a carpet knife or the like in a simple manner. In particular, in case of a bottom element of several layers of cardboard, it is possible that the inner layers are already pre-punched and a marking, in particular a line, is provided on the outer layer along which the outermost layer has to be cut out.

The invention will be explained hereunder in more detail with reference to one rolling element, wherein, per bicycle transport container, preferably two, in particular four such rolling elements are arranged at the bottom element.

In a preferred embodiment, the rolling element comprises a connection element. The same is preferably configured such that it partly engages behind the bottom element. In the mounted state, a part of the connection element thus abuts on an inner side of the bottom element. Here, it is preferred in particular that the connection part comprises at least one, in particular two pivotable retaining elements. For mounting, such a pivoting of the at least one retaining element is performed that the same abuts on the inner side of the bottom element or engages behind the bottom element. Thereby, a good fastening of or a good connection between the connection part and the bottom element of the bicycle transport container can be realized.

It is further preferred that the connection part comprises an in particular frame-shaped positioning part. The positioning part is substantially arranged in the opening in the bottom element. Thus, in a preferred embodiment the positioning part has a height or a vertical extension in the mounted state which essentially corresponds to the thickness of the bottom element. In particular, the positioning element lines the opening in the bottom element, when in the mounted state. Here, the opening can comprise an in particular rectangular cross section.

It is further preferred that the connection part comprises an abutment part. In the mounted state, the abutment part abuts on an outer side of the bottom element and thus prevents in particular a tilting of the connection part.

In a particularly preferred embodiment, the retaining element is pivotably connected to the positioning part and/or the abutment part. In particular, the pivotable connection may be realized as a film hinge. It is particularly preferred that the entire connection part is made from one plastic part. This is possible in a simple manner in particular when film hinges are provided.

Preferably, the abutment part has a recess which is preferably surrounded, in particular completely, by the frame part.

In a particularly preferred development, the rolling element comprises a fixing part which preferably cooperates with the connection part. In a preferred development it is in particular possible to insert the fixing part into the recess of the abutment part of the connection part. Preferably, the retaining elements are pivoted upon such insertion of the fixing part into the recess of the connection part. Here, the pivoting is done such that the retaining elements are pivoted behind the bottom element of the bicycle transport container, seen from the outside, and then abut on the inner side of the bottom element or engage behind the bottom element.

In a preferred development, the fixing part comprises a base part which in the mounted state abuts on an outer side of the abutment part of the connection part. In particular, for mounting, the fixing part is inserted into the recess of the abutment part until the base part abuts on the outer part of the abutment part. Preferably, the base part and/or the abutment part comprise connecting pegs that engage into connection openings in the mounted state. Here, in particular, a locking or the like can be performed. Thus, especially by inserting the fixing part into the recess of the connecting part, a fixed connection of both parts is achieved via the connecting pegs which engage into connection openings.

Preferably, the fixing part comprises an insert part connected to the base part. This part is that part that is inserted into the recess of the abutment part of the connection part for the purpose of mounting. Here, the outer dimensions of the insert part substantially correspond to the inner dimensions of the recess in the abutment part.

For the connection of the roller to the rolling element, it is preferred that the fixing part comprises a receptacle for a roller. The receptacle can be in particular a circular cylindrical opening into which a journal of a roller can be inserted. The journal of the roller serves preferably as a pivot axis of the roller. Likewise, a pin or gudgeon may be provided on the fixing part as a receptacle, onto which a roller or a receiving opening of a roller is plugged.

Further, the invention relates to a rolling element for a bicycle transport container. The rolling element of the invention comprises a connection part and a fixing part. The connection part is configured such that, in the mounted state, it engages behind a bottom element of the bicycle transport container or abuts on an inner side of the bottom element. The fixing part cooperates with the connection part.

The individual parts of the rolling element of the invention, in particular the connection part and the fixing part, are developed in an advantageous manner as described above in the context of the bicycle transport container having at least one rolling element.

BRIEF DESCRIPTION OF THE DRAWINGS

The invention will be explained hereunder in more detail with reference to a preferred embodiment and to the accompanying drawings.

In the Figures.

DESCRIPTION OF THE INVENTION

Figure 1:
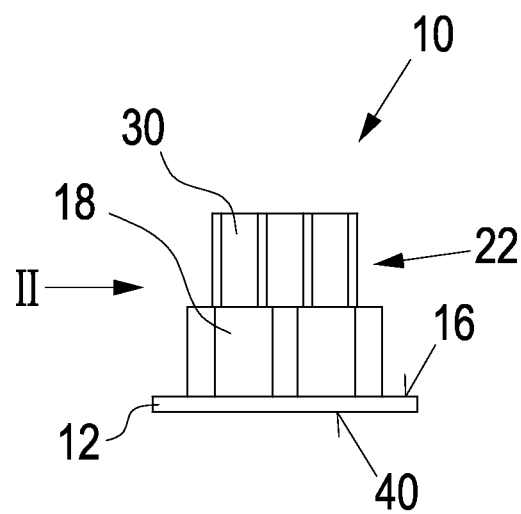
FIG. 1 shows a schematic side view of the connection part.
Figure 2:
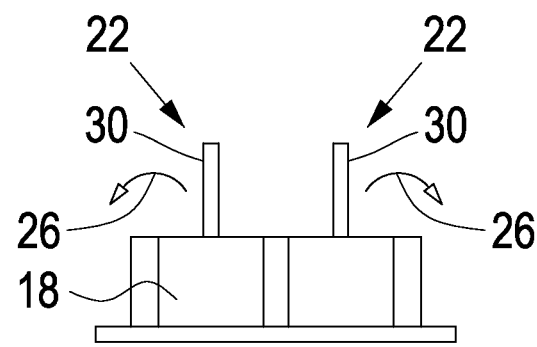
FIG. 2 shows a schematic side view of the connection part in the direction of the arrow II in FIG. 1.
Figure 3:
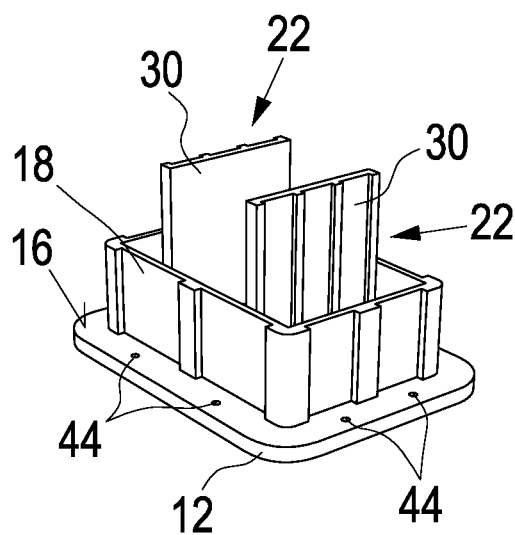
FIG. 3 shows a schematic top plan view of the connection part.
Figure 4:
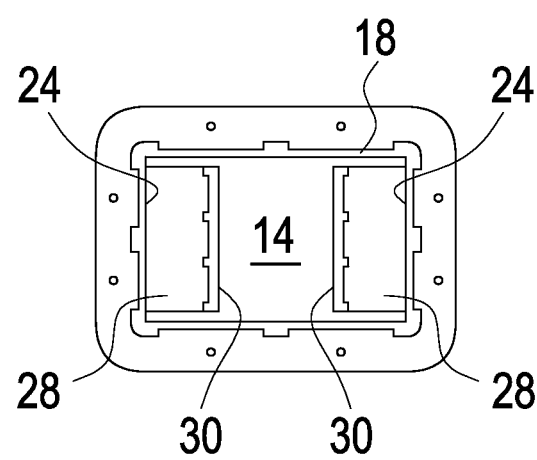
FIG. 4 shows a schematic perspective view of the connection part.
Figure 5:
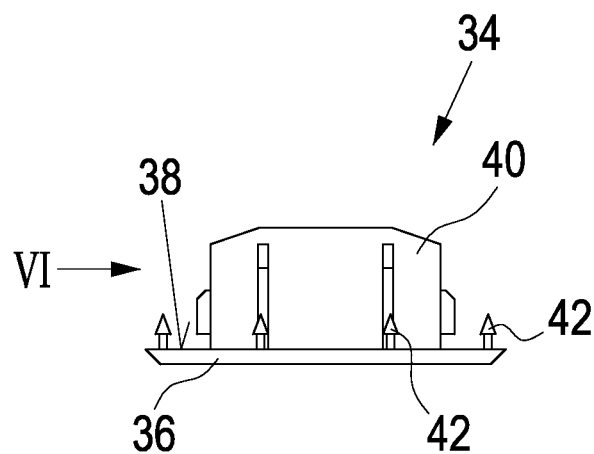
FIG. 5 shows a schematic side view of the fixing part.
Figure 6:
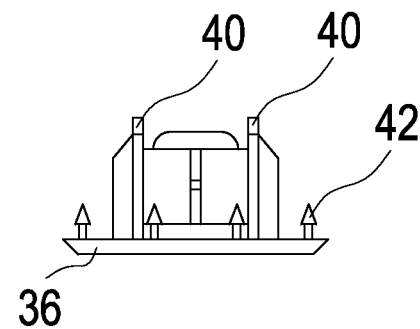
FIG. 6 shows a schematic side view of the fixing part in the direction of the arrow VI in FIG. 5.
Figure 7:
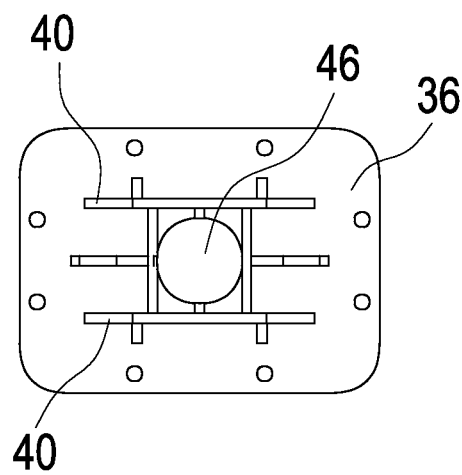
FIG. 7 shows a schematic top plan view of the fixing part.
Figure 8:
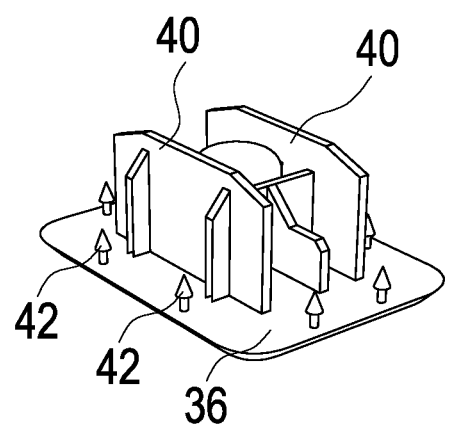
FIG. 8 shows a schematic perspective view of the fixing part.
Figure 9:
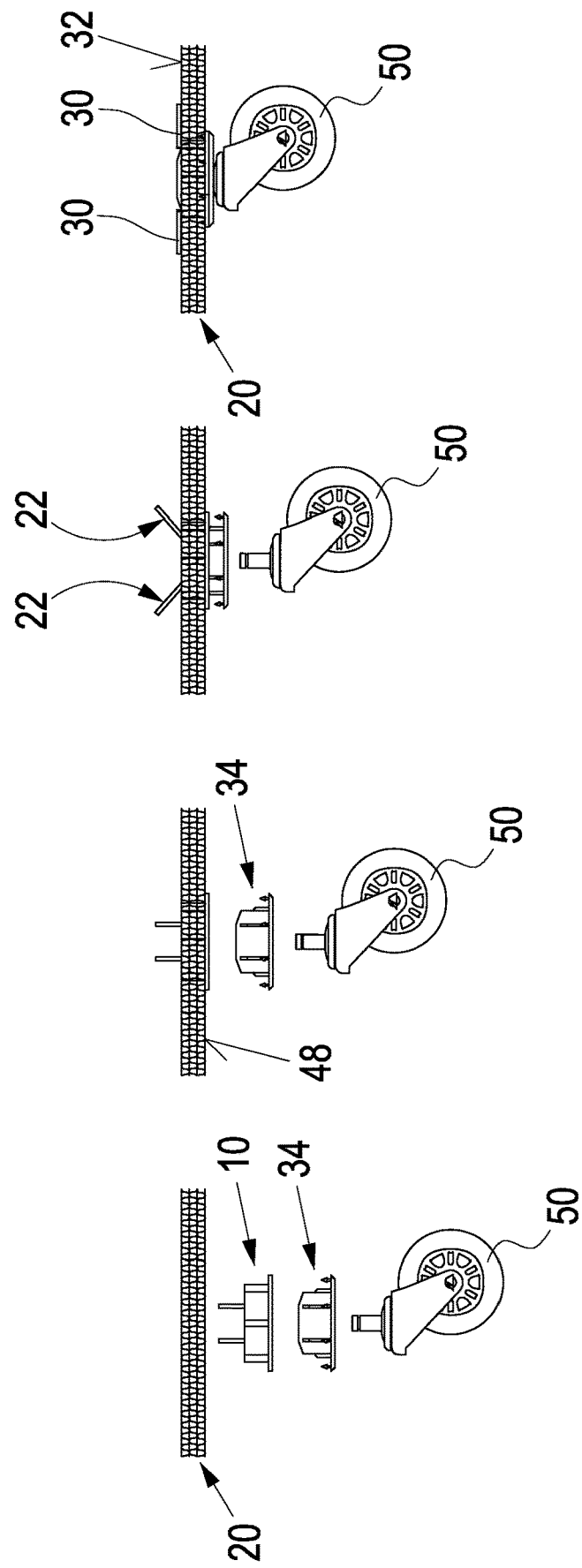
FIGS. 9A-9D show schematic views of different steps of the assembly of the rolling element.
Figure 10:
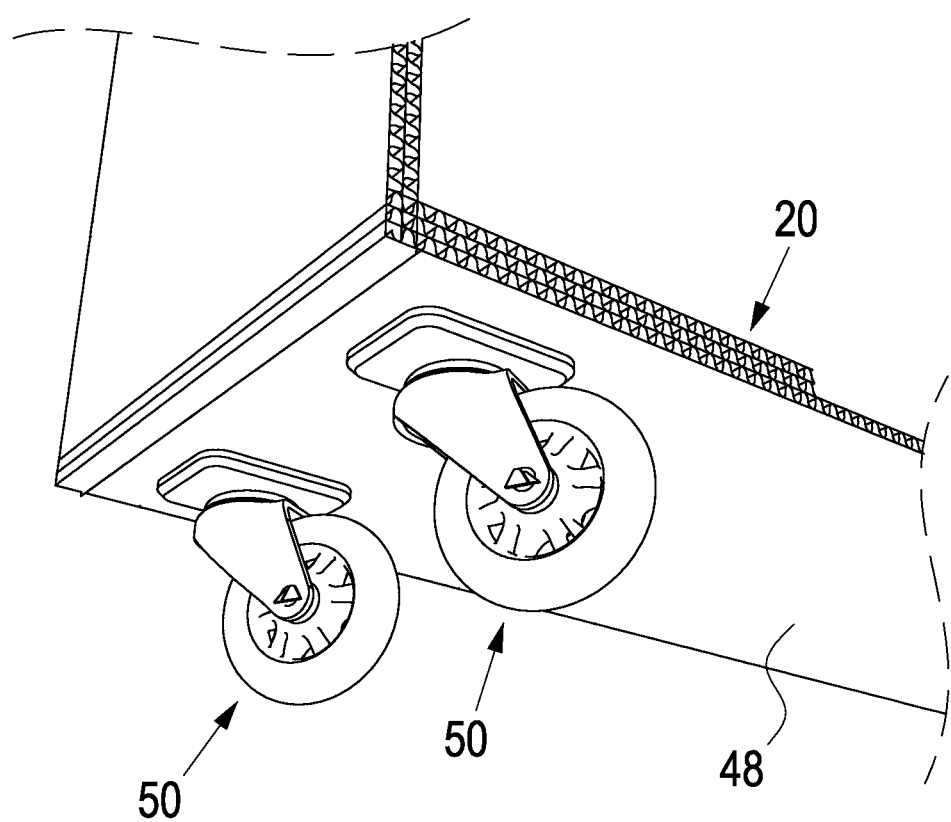
FIG. 10 shows a schematic perspective view of a detail of a bicycle transport container with rolling elements mounted thereto.

The connection part 10 illustrated in FIGS. 1-4 comprises an abutment part 12. The abutment part 12 is a substantially planar part of frame-shaped design and surrounds a recess 14 (FIG. 4). A positioning part 18 is arranged on an upper side 16 of the abutment part. In the embodiment illustrated, the positioning part 18 completely surrounds the recess 14 which is rectangular in top plan view. The positioning part 18 has a height (FIGS. 1 and 2) that corresponds to the thickness of a bottom element 20 (FIG. 10).

In the embodiment illustrated, the connection part 10 further comprises two retaining elements 22. The retaining elements 22 are each connected to the abutment part 12 via film hinges (FIG. 4). Due to the film hinges 24, the two retaining elements 22 can be pivoted in the direction of a respective arrow 26 (FIG. 2) To allow for a corresponding pivoting, the two retaining elements 22 are L-shaped in cross section and each comprises an inner part 28 and an outer part 30 fixedly connected to the inner part 28 at a right angle. The inner part 28 is pivotably connected to the abutment part 12 via the film hinge 24. The inner part 28 has a width corresponding to the height of the positioning part 18. Thereby, it is possible to pivot the retaining elements 22 such that the inner parts 28 abut on an inner side of the positioning part 18 and the outer parts 30 of the retaining elements 22 abut on an inner side 32 of the bottom element 20 (FIG. 10).

The fixing part 34 illustrated in FIGS. 5-8 comprises a in particular plate-shaped base part 36. An insert part 40 is provided on an upper part 38 of the base part 36. For assembly, the insert part 40 is inserted into the connection part 10 (FIG. 10). In the assembled state (FIG. 10), the upper side 38 abuts on an outer side 40 (FIG. 1) of the connection part 10. For a better connection of the fixing part 34 to the connection part 10, pin-shaped protrusions 42 are provided on the upper side 38, which in the assembled state engage into openings 44 (FIG. 3) and are locked in the same due to their arrow-shaped design.

Furthermore, the fixing part 34 has a central receptacle 46 which in the embodiment illustrated is in the form of an opening. A pin-shaped protrusion of a roller is inserted into the opening 46 for fixation.

The assembly can be seen schematically in FIGS. 9A-9D. First, a rectangular opening is provided in a bottom element 20 of a bicycle transport container made in particular of cardboard. The same may be cut out, punched or already pre-perforated. The opening of rectangular cross section in the bottom element 20 comprises an outer dimension corresponding to the outer dimension of the positioning part 18, wherein the opening may possibly be slightly smaller so that upon insertion, a certain friction occurs and an initial fixing is already realized.

In the next step, the connection part 10 is inserted from the outer side 48 into the opening provided in the bottom element 20. Thereafter, the fixing part 34 or the insert part 40 of the fixing part 34 is inserted into the recess 14 of the connecting part, also from the outer side with respect to the bicycle transport container. By inserting the insert part 40 into the recess 14, the two retaining elements 22 of the connection part 10 are folded outward until the outer parts 30 of the retaining elements 22 rest on the inner side 32 of the bottom element 20. At the same time, the connecting pins 42 of the fixing part 34 are engaged into the connecting openings 44 of the connection part 10.

Thus, the connection part and the fixing part of the rolling element are fixedly connected to the bottom element 20 of the bicycle transport container.

It is then possible in a simple manner to insert a pin of a roller 50 (FIG. 10) into the recess 46. The same preferably comprises locking elements, rings and the like, but can also be pulled out again. In the assembled state, the rollers 50 thus are arranged on the outer side 48 of the bottom element 20 of the bicycle transport container, as illustrated in FIG. 10.

The invention claimed is:

1. A cardboard bicycle shipping container comprising:
an outer cardboard container;
retaining or receiving elements for bicycle elements, the elements being provided in the outer cardboard container; and
a plurality of rolling elements directly connected to a bottom element of the outer cardboard container,
wherein the bottom element comprises at least one opening therethrough designed to receive at least one of the plurality of rolling elements through the at least one opening thereby resulting in the plurality of rolling elements being directly connected to the bottom element of the outer cardboard container, and wherein at least one of the plurality of rolling elements comprises a connection part that is folded outward such that the connection part partly engages the bottom element of the outer cardboard container from behind.

2. The cardboard bicycle shipping container according to claim 1, wherein the connection element comprises pivotable retaining elements which in a pivoted state engage behind the bottom element.

3. The cardboard bicycle shipping container according to claim 1, wherein the connection part comprises a positioning part which is substantially arranged in the opening of the bottom element.

4. The cardboard bicycle shipping container according to claim 1, wherein the connection part comprises an abutment part abutting on an outer side.

5. The cardboard bicycle shipping container according to claim 2, wherein the retaining elements are pivotably connected to a positioning part or an abutment part.

6. The cardboard bicycle shipping container according to claim 4, wherein the abutment part comprises a recess.

7. The cardboard bicycle shipping container according to claim 1, wherein the rolling element comprises a fixing part.

8. The cardboard bicycle shipping container according to claim 7, wherein the fixing part is inserted into a recess of an abutment part.

9. The cardboard bicycle shipping container according to claim 8, wherein the fixing part causes a pivoting of the retaining elements upon insertion into the recess.

10. The cardboard bicycle shipping container according to claim 7, wherein the fixing part comprises a base part abutting on an outer side of an abutment part.

11. The cardboard bicycle shipping container according to claim 10, wherein the base part or the abutment part comprise connection pins which engage into connection openings.

12. The cardboard bicycle shipping container according to claim 9, wherein the fixing part comprises a receptacle for a roller.

13. A plurality of rolling elements for a cardboard bicycle shipping container comprising:
a connection part which in a mounted state engages partly behind a bottom element of the cardboard bicycle shipping container; and
a fixing part adapted to be inserted into a recess of the connection part for connection with the connection part,
wherein the bottom element comprises at least one opening therethrough designed to receive at least one of the plurality of rolling elements through the at least one opening thereby resulting in the plurality of rolling elements being directly connected to the bottom element of the cardboard bicycle shipping container, and wherein at least one of the plurality of rolling elements comprises a connection part that is folded outward such that the connection part partly engages the bottom element of the cardboard bicycle shipping container from behind.

14. A cardboard bicycle shipping container comprising:
an outer cardboard container;
retaining or receiving elements for bicycle elements, the elements being provided in the outer container; and
a plurality of rolling elements directly connected to a bottom element of the outer cardboard container through a plurality of respective openings in the bottom element,
wherein each of the plurality of openings in the bottom element connectively receive one of the plurality of rolling elements therethrough so as to result in the direct connection of the plurality of rolling elements to the bottom element, and wherein the plurality of rolling elements each comprise a connection part that is folded outward such that the connection part abuts the inner side of the bottom element and partly engages the bottom element from behind.

15. The cardboard bicycle shipping container according to claim 14, wherein the connection element comprises pivotable retaining elements which in a pivoted state engage behind the bottom element.

16. The cardboard bicycle shipping container according to claim 14, wherein the connection part comprises a positioning part which is substantially arranged in the opening of the bottom element.

17. The cardboard bicycle shipping container according to claim 14, wherein the connection part comprises an abutment part abutting on an outer side.

18. The cardboard bicycle shipping container according to claim 14, wherein the retaining elements are pivotably connected to a positioning part or an abutment part.

19. The cardboard bicycle shipping container according to claim 1, wherein the at least one opening designed to receive at least one of the plurality of rolling elements located in the bottom element is defined by a perforation and/or a marking such that it is possible for a user to create the corresponding at least one opening by cutting with a tool or knife.

20. The cardboard bicycle shipping container according to claim 14, wherein the plurality of openings designed to receive one of the respective plurality of rolling elements located in the bottom element are defined by a perforation and/or a marking such that it is possible for a user to create the corresponding plurality of openings by cutting with a tool or knife.

* * * * *